3,017,441
PROCESS FOR NUCLEAR ALKYLATION OF AROMATIC HYDROCARBONS
Owen H. Thomas, Chicago, and William P. Hettinger, Jr., Dalton, Ill., assignors to Sinclair Refining Company, New York, N.Y., a corporation of Maine
No Drawing. Filed Dec. 10, 1957, Ser. No. 701,730
9 Claims. (Cl. 260—671)

This invention relates to a process for the alkylation of benzene and alkyl benzene compounds. More specifically this invention is concerned with a process for the alkylation of benzene and alkyl benzene compounds with olefinic hydrocarbons using a dry polystyrene sulfonic acid resin as the alkylating catalyst.

The alkylation of benzene and alkyl benzene compounds with olefinic hydrocarbons is a highly desirable process since the alkylated products are employed in gasoline for octane improvement purposes. For instance benzene or toluene can be converted into cumene or the cymenes by use of a mixed propane-propylene blend to produce a product of considerably increased volume with a higher blending octane number. To illustrate this, blending studies have shown that toluene has a blending octane value of 124 while meta and para cymene have blending octane values of 154 and 150 respectively. There is also a 46 volume percent increase in yield over the toluene originally present. The alkylated compounds are also useful as petroleum chemicals, e.g. as intermediates for a variety of products.

The present process is directed to a method for the production of alkylated benzene and alkyl benzene compounds. In our process, a benzene or alkyl benzene compound is alkylated with an olefinic compound under substantially anhydrous conditions and at high pressures and temperatures using a strongly acidic polystyrene sulfonic acid resin catalyst.

The compounds suitable for treatment in our process are benzene and its lower alkyl homologs such as toluene and the xylenes. These compounds correspond to the following general formula:

where $n$ is 0 to 3 and R is an alkyl radical containing generally from about 1 to 20 carbon atoms but preferably from about 1 to 8 carbon atoms. The olefinic hydrocarbons suitable as alkylating agents are the low molecular weight aliphatic olefins containing preferably from about 2 to 6 carbon atoms such as propylene, the n-butenes, isobutenes and isoamylenes. However, the straight chain olefins may contain up to 12 or more carbon atoms. The molar ratio of the aromatic compound to the olefin reacted in our process is generally from about 0.3 to 5.0, and about 0.8 to 1.5 is preferred for mono-alkylation.

The alkylation is effected in the presence of a polystyrene-divinylbenzene nuclear sulfonic acid resin catalyst which is strongly acidic. These resins are presently used commercially almost wholly as cation exchange resins in water softening and in chemical purification (acid-base interaction) for the pharmaceutical industry. They can be prepared by various methods and according to one method, for instance, polystyrene is co-polymerized with nominal amounts (4 to 24%) of divinylbenzene (DVB) to form resin beads which are sulfonated with sulfonic acid to produce a strongly acidic aryl sulfonic acid resin, solid in form, extremely corrosive in its hydrogen form, and containing a ratio of sulfonic acid radicals to benzene rings of about 1 to 0.5:1. Although the particle size of the catalyst may vary it is generally from about 5 to 100 mesh, however, about 10 to 50 mesh is preferred.

Our process can be conducted at temperatures from about 220° F. to 375° F. and preferably at temperatures from about 280° F. to 330° F. The pressure employed is generally from about 200 to 2,000 p.s.i.g. olefin pressure with about 500 to 1,000 p.s.i.g. being preferred. Moreover, the utilization of a high pressure reaction medium results in a liquid phase alkylation of the benzene and alkyl benzene fraction of the hydrocarbon feed. This liquid phase benzene and alkyl benzene medium enhances the alkylating activity of the polystyrene sulfonic acid resin since benzene and alkyl benzenes, e.g. toluene, are known to appreciably swell resins of this type. This swelling renders the entire pore structure of the resin bead accessible for catalytic alkylating activity.

We also employ a weight hourly space velocity of from about 0.3 to 5.0 and preferably from about 0.9 to 2.0. The term "weight hourly space velocity" or WHSV is used to indicate the weight of olefin/hour/weight of catalyst in the reaction zone. In the operation of our process we have found that the olefinic fraction can undergo self-polymerization as well as benzene and alkyl benzene alkylation when conducted in the presence of benzene; however, in the presence of alkyl benzenes, e.g. toluene, polymerization is absent.

The invention will be more clearly described with the following examples.

*Example I*

A 1-inch internal diameter Universal stainless steel reactor equipped with a tantalum liner and Thermowell is employed. The reactor, after each charging, is placed in a bronze block furnace controlled by "micro-switch" thermostats. Catalyst bed temperatures are measured by means of Chromelalumel thermocouples.

141 grams of dry, solid, 10 to 14 mesh polystyrene sulfonic acid resin catalyst cross linked with about 8 to 12 percent DVB and containing a sulfonic acid radical to aromatic ring ratio of 0.75 to 1 is charged into the tantalum-lined reactor. The catalyst bed is heated to a temperature of 285° F. as indicated by 4 thermocouples spaced at fixed intervals in the catalyst bed. Toluene is introduced into the top of the reactor through a pump at a feed rate of 74 grams per hour and propylene is introduced into the top of the reactor from a pressured blowcase at a fixed rate of 54 grams per hour (0.52 WHSV) while maintaining a constant reactor pressure of 1000 p.s.i.g. The temperatures in the reaction zone were in between 285° F. and 340° F.

Following a 90-minute reaction period, 171 grams of product, with an index of refraction $N_D^{25}$ 1.4892, is recovered and analyzed through mass spectrographic measurements. 54 grams of all three isomers of cymene in thermodynamic equilibrium and in an ortho to meta to para mole ratio of 1 to 0.5 to 1.5 respectively, are produced. The total conversion is 35 percent based on the propylene. The above-described process can also be used to convert benzene or toluene into cumene or the cymenes by use of a mixed propane-propylene blend.

*Example II*

The following example is conducted with the equipment and in substantialy the same manner illustrated in Example I.

151 grams of dry, solid, 10–14 mesh polystyrene sulfonic acid resin catalyst, cross-linked with about 8–12 percent DVB and containing a sulfonic acid radical to aromatic ring ratio of 0.75 to 1, is charged into the tantalum lined reactor. The catalyst bed is heated to a temperature of about 300° F. as indicated by four thermocouples spaced at fixed intervals in the catalyst bed. Benzene is introduced into the top of the reactor through a pump at a feed rate of 73 grams per hour and butene-1 is introduced into the top of the reactor from a pressured blowcase at a fixed rate of 69 grams per hour, 0.49 WHSV, while maintaining a constant reactor pressure of 500 p.s.i.g. The average temperature in the reaction zone is 304° F. Following a two-hour reaction period a substantial yield of butyl benzene is recovered.

We claim:

1. A process for alkylating an aromatic hydrocarbon of the following general formula

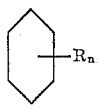

where $n$ is 0 to 3 and R is an alkyl radical containing from about 1 to 20 carbon atoms, with a low molecular weight aliphatic olefin comprising reacting the aromatic hydrocarbon with the olefin in the presence of a polystyrene sulfonic acid resin catalyst cross-linked with divinylbenzene at a temperature of from about 220° F. to 375° F., a pressure of from about 200 p.s.i.g. to 2,000 p.s.i.g., and a WHSV of from about 0.3 to 5.0.

2. The process of claim 1 wherein said low molecular weight olefin contains from 2 to 6 carbon atoms, said temperature is from about 280° F. to 330° F., said pressure is from about 500 p.s.i.g. to 1,000 p.s.i.g., said WHSV is from about 0.9 to 2.0, and R is an alkyl radical containing from about 1 to 8 carbon atoms.

3. The process of claim 2 wherein the aromatic hydrocarbon is toluene and the low molecular weight olefin is propylene.

4. The process of claim 2 wherein the aromatic hydrocarbon is benzene and the low molecular weight olefin is butene-1.

5. A process for alkylating an aromatic hydrocarbon of the following general formula

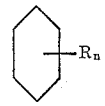

where $n$ is 0 to 3 and R is an alkyl radical containing from about 1 to 20 carbon atoms, with a low molecular weight aliphatic olefin comprising reacting the aromatic hydrocarbon with the olefin in the presence of a polystyrene sulfonic acid resin catalyst cross-linked with divinylbenzene, said catalyst containing a ratio of sulfonic acid radicals to benzene rings of about 1 to 0.5:1, at a temperature of from about 220° F. to 375° F., a pressure of from about 200 p.s.i.g. to 2,000 p.s.i.g., and a WHSV of from about 0.3 to 5.0.

6. The process of claim 5 wherein said low molecular weight olefin contains from 2 to 6 carbon atoms, said temperature is from about 280° F. to 330° F., said pressure is from about 500 p.s.i.g. to 1,000 p.s.i.g., said WHSV is from about 0.9 to 2.0, and R is an alkyl radical containing from about 1 to 8 carbon atoms.

7. The process of claim 6 wherein the aromatic hydrocarbon is toluene and the low molecular weight olefin is propylene.

8. The process of claim 6 wherein the aromatic hydrocarbon is benzene and the low molecular weight olefin is butene-1.

9. A process for alkylating the nucleus of an aromatic hydrocarbon having not more than two alkyl substituents of one to six carbon atoms each, which comprises reacting said aromatic hydrocarbon with a low molecular weight olefinic hydrocarbon in the presence of a sulfonated polystyrene-divinyl benzene ion exchange resin catalyst at a temperature of from about 220° F. to 375° F., a pressure of from about 200 to 2,000 p.s.i.g., and a WHSV of from about 0.3 to 5.0.

References Cited in the file of this patent

UNITED STATES PATENTS 2,802,884  D'Alelio _____ Aug. 13, 1957

FOREIGN PATENTS 733,753  Great Britain _____ July 20, 1955